A. OTTO, Jr.
HAY LOADER.
APPLICATION FILED JULY 29, 1909.

1,027,885.

Patented May 28, 1912.
2 SHEETS—SHEET 2.

Witnesses:
Milton Lenoir
E. M. Klatcher

Inventor:
August Otto, Jr.
By Gillson & Gillson
Attorneys

UNITED STATES PATENT OFFICE.

AUGUST OTTO, JR., OF SANDWICH, ILLINOIS.

HAY-LOADER.

1,027,885.  Specification of Letters Patent.  Patented May 28, 1912.

Application filed July 29, 1909. Serial No. 510,233.

*To all whom it may concern:*

Be it known that I, AUGUST OTTO, Jr., a citizen of the United States, and resident of Sandwich, county of Dekalb, and State of Illinois, have invented certain new and useful Improvements in Hay-Loaders, of which the following is a specification, and which are illustrated in the accompanying drawings, forming a part thereof.

The invention forms an improvement on the hay loader for which Letters Patent No. 888,527 were issued to me under date of May 26th, 1908.

The object of the invention is to provide means for staying the rake-heads as they encounter the ground, to prevent their injury by strains due to the contact of the rake-teeth with unyielding objects, such as hillocks, stones or stumps.

The invention consists in the mechanism hereinafter described, and which is illustrated in the accompanying drawings, in which—

Figure 1:
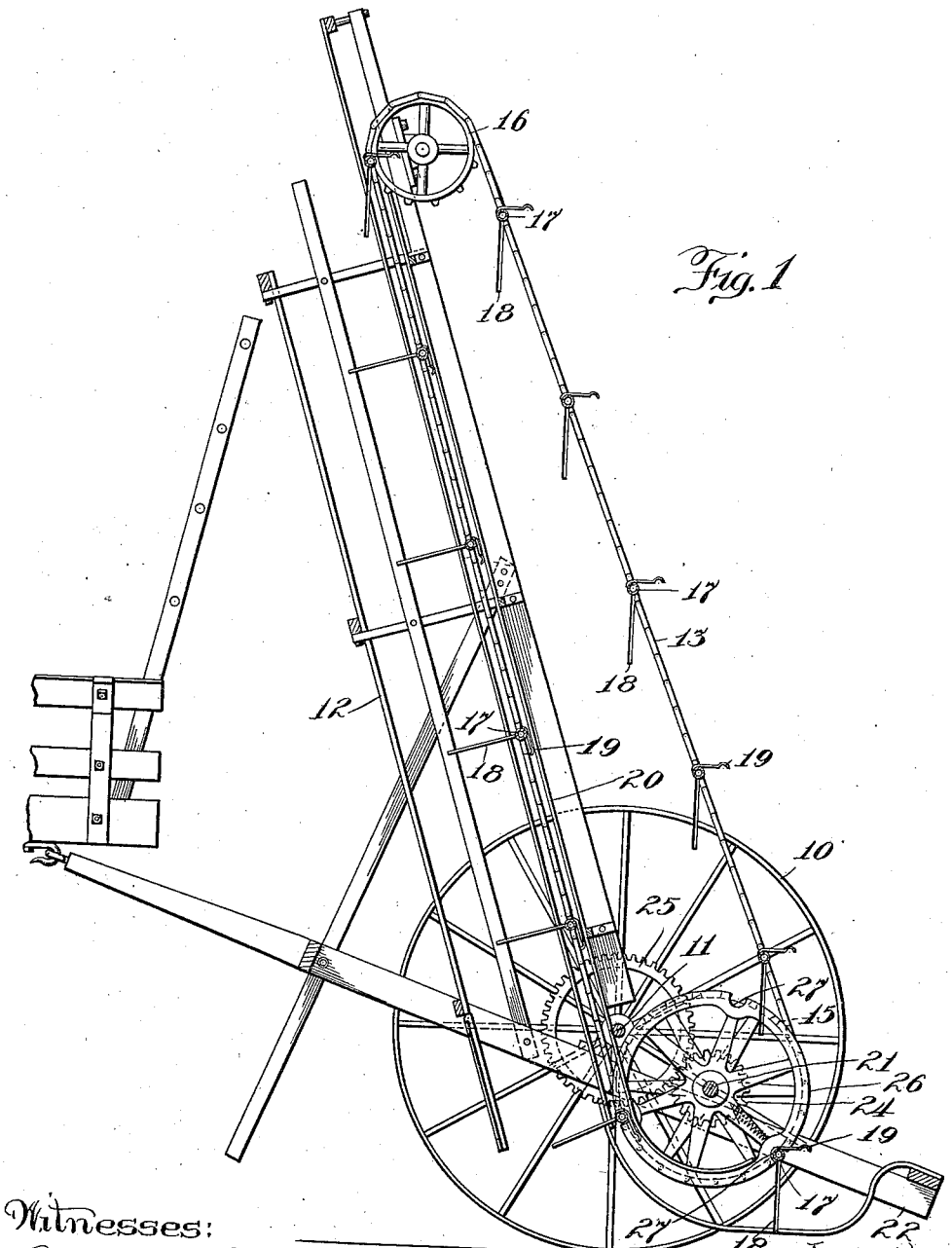
Figure 2:
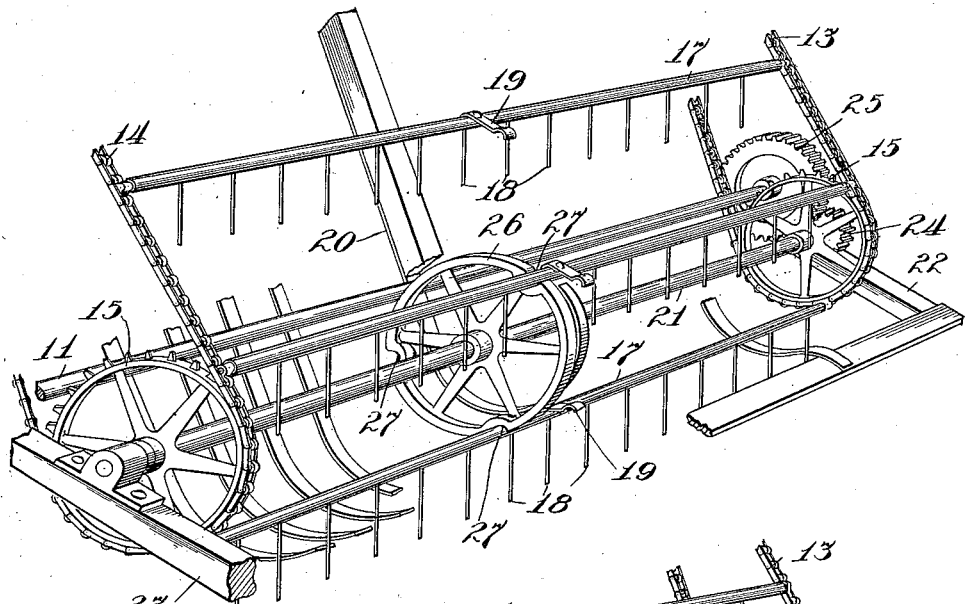
Figure 3:
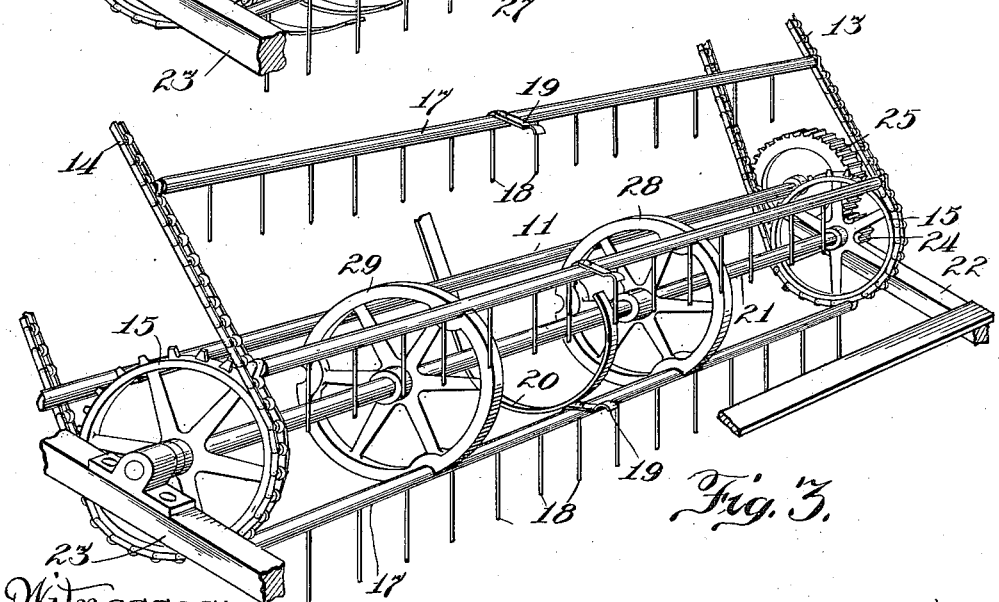

Figure 1 is a vertical sectional view of the loader; Fig. 2 is a perspective view of the lower end of the loader, some of the parts being broken away; and Fig. 3 is a similar view showing a modified form of construction.

There is shown in the drawings at 10 one of the pair of wheels upon which the loader is mounted, the axle being designated 11. The deck of the machine is shown at 12, and at 13, 14, are shown a pair of sprocket chains one at each side of the frame of the machine, each chain running over a pair of sprocket wheels, as 15, 16, one at the lower and the other at the upper end of the frame; and at 17 are shown rake-heads carried by the two chains and having rake-teeth 18. The rake-heads are so attached to the chain as to swing freely, but are so held while in service that their teeth project outwardly to gather the hay from the ground and carry it up over the deck 12. For the purpose of so holding the rake-heads in position for service, each is provided with a laterally-projecting shoe 19, which slides under a guide-bar 20 located over the deck.

The sprocket wheels 15 are mounted upon a shaft 21, journaled in suitable boxes in the side sills 22, 23, of the frame. The shaft 21 is driven from the axle 11 by means of any suitable gearing, as shown, such gearing comprising a pinion 24 on the shaft 21, meshing with a gear wheel 25 on the axle.

While the lower end of the guide-bar 20 is flexible and adapted to yield to strain upon the teeth, it is found that such strains, due to the contact of the rake-teeth with obstructions such as hillocks, stones or stumps, are frequently transmitted in such direction as to bend the rake-heads 17 beyond their elastic limit. This difficulty is now overcome by mounting upon the shaft 21 a rotating abutment 26, against which the rake-bars bear as they pass the sprocket wheels 15. This abutment takes the form of a wheel having recesses 27 so spaced as to receive the rake heads as they descend and hold them in engagement until their upward movement is commenced. Preferably the recesses 27 have flaring throats in order that they may more certainly engage the rake-heads, thereby compensating for any inaccuracies in construction. The abutment is, as shown in Fig. 2, located adjacent the vertical median line of the machine; or, as shown in Fig. 3, it may be duplicated, two such abutments 28, 29, being employed and being located one upon each side of the median line. With the rake-heads thus stayed all danger of bending them is obviated, as the combined strength of the rake-head and axle is such that neither will yield, though the strains be sufficient to raise the machine bodily from the ground.

I claim as my invention—

1. In a hay loader, in combination, a frame, two pairs of sprocket wheels mounted at opposite sides of the frame, chains running one on each pair of the sprocket wheels, a rake-head carried by the two chains, and a rotative abutment engageable by the head and located between corresponding sprocket wheels of each pair.

2. In a hay loader, in combination, an inclined frame, two shafts journaled respectively across the lower and upper ends of the frame, two sprocket wheels fixed on each shaft, a chain running on each pair of wheels, rake-heads carried by the two chains, an abutment fixedly mounted on the lower shaft and engageable by the rake-heads.

3. In a hay loader, in combination, an inclined frame, two shafts journaled, respectively, across the lower and upper ends of the frame, two sprocket wheels fixed on each shaft, a chain running on each pair of wheels, rake-heads carried by the two chains, an abutment fixedly mounted on the lower shaft and having notches in its peripheral face for engaging the rake-heads.

4. In a hay loader, in combination, an inclined frame, two shafts journaled, respectively, across the lower and upper ends of the frame, two sprocket wheels fixed on each shaft, a chain running on each pair of wheels, rake-heads carried by the two chains, an abutment fixedly mounted on the lower shaft and having notches with flaring throats in its peripheral face for engaging the rake-heads.

5. In a hay loader, in combination, a frame, two pairs of sprocket wheels mounted at opposite sides of the frame, chains running one on each pair of the sprocket wheels, a rake-head carried by the two chains, and a rotative abutment engageable by the head and located between corresponding sprocket wheels of each pair and spaced apart from the wheels to allow clearance for the raking teeth.

6. In a hay loader, in combination, an inclined frame, two shafts journaled respectively across the lower and upper ends of the frame, two sprocket wheels fixed on each shaft, a chain running on each pair of wheels, rake-heads carried by the two chains, an abutment fixedly mounted on the lower shaft and engageable by the rake-heads and spaced from the wheels to allow clearance for the raking teeth.

AUGUST OTTO, Jr.

Witnesses:
CLARK GRAVES,
R. L. SIDFORD.

Copies of this patent may be obtained for five cents each, by addressing the "Commissioner of Patents, Washington, D. C."